Patented Nov. 5, 1946

2,410,776

UNITED STATES PATENT OFFICE 2,410,776

MANUFACTURE OF HYDRACRYLIC ACID

Harold S. Davis, Greenwich, Conn., assignor to American Cyanamid Company, New York, N. Y., a corporation of Maine No Drawing. Application December 26, 1942, Serial No. 470,238

5 Claims. (Cl. 260—535)

This invention relates to the manufacture of hydracrylic acid and more particularly to the recovery of hydracrylic acid from a salt.

Hydracrylic acid may be prepared conveniently by the alkaline hydrolysis of ethylene cyanohydrin followed by treatment with a mineral acid such as sulfuric acid. The resulting solution contains free hydrocrylic acid, minor proportions of impurities such as amino compounds, and a salt such as sodium sulfate. One method of recovering the hydracrylic acid from such a solution is to extract the hydracrylic acid from the solution. Desirably this is done after the solution has been evaporated until all or part of the water has been evaporated. The resulting slurry of hydracrylic acid and a salt may be centrifuged or filtered. If substantially all of the water has been evaporated, the filtrate or centrifugate is the final product of hydracrylic acid. One method of recovering the hydracrylic acid left in the salt cake is to extract it with a solvent such as an alcohol or a ketone. The use of organic solvents to extract the hydracrylic acid from a salt is somewhat expensive and causes some difficulties from the standpoint of a commercial process. Among these are the recovery of the solvent, the apparatus necessary for the extraction, etc. Another difficulty with the solvent extraction method is that it is difficult to obtain the best yields commercially even though such yields may be obtained by careful control by means of the solvent extraction processes. Such careful control is generally not feasible for large scale operation.

An object of this invention is to provide a process for recovering hydracrylic acid from a salt without the use of volatile solvents.

Another object of this invention is to provide a process for the production of hydracrylic acid whereby very high yields are commercially obtainable.

Still another object of this invention is to provide an improved process for the production of hydracrylic acid from ethylene cyanohydrin by means of the alkaline hydrolysis of the latter, thereby producing a salt of hydracrylic acid which, in turn, is converted to free hydracrylic acid by treatment with an acid and thereby forming a salt.

These and other objects are attained by extracting hydracrylic acid from a salt cake by means of an aqueous solution of an alkali metal hydroxide. More specifically, my invention is accomplished by hydrolyzing ethylene cyanohydrin by means of an aqueous solution of a strong base of an alkali metal, subsequently converting the salt of hydracrylic acid thus formed into free hydracrylic acid, evaporating water from the resulting solution, separating the hydracrylic acid from the salt of the other acid which has been formed, extracting the hydracrylic acid adhering to said salt with an aqueous solution of a strong base of the same alkali metal, and utilizing the resulting solution in the hydrolysis of ethylene cyanohydrin in another cycle of the process. The following example, in which the proportions are in parts by weight, is given by way of illustration and not in limitation.

Example

Ethylene cyanohydrin is added to a solution of sodium hydroxide in water in the ratio of 710 parts of the former to 404 parts of sodium hydroxide and to 1,000 parts of water. The temperature of the reacting mixture is preferably maintained at about 95°–100° C. and the ethylene cyanohydrin is preferably added slowly or in small portions at short intervals of time over a period of about 1 hour. During the addition of the ethylene cyanohydrin, the reacting mixture is agitated by any convenient means.

A large proportion of the ammonia which is liberated during the addition of the ethylene cyanohydrin is given up and its removal may be facilitated by introducing a small stream of steam or air into the reacting mixture. After all of the ethylene cyanohydrin is added the solution may be maintained at the reaction temperature for from a few minutes to an hour or more in order to insure the complete hydrolysis of any unreacted ethylene cyanohydrin. The solution may be advantageously evaporated to the point where a solid material begins to precipitate from the hot solution.

The solution of sodium hydracrylate prepared in accordance with the foregoing description, may be cooled to about 40° C. after which about 518 parts of sulfuric acid (95.5%) is added (based on the proportions mentioned above). During the addition of the acid the temperature of the solution is maintained at about 35°–50° C. Substantially all water is then removed from the solution by heating under vacuum, e. g., at about 30 mm. of mercury absolute pressure and with constant evaporation.

The resulting slurry of hydracrylic acid and sodium sulfate is filtered or centrifuged. The filtrate or centrifugate is substantially pure hydracrylic acid.

The salt cake obtained by the foregoing filtration or centrifuging is washed with an aqueous solution containing about 25% of sodium hydroxide. The washings which contain substantially all of the hydracrylic acid contained in the salt cake are employed in making up the aqueous solution of sodium hydroxide to which ethylene cyanohydrin is to be added for the next or another cycle in the hydrolysis of the ethylene cyanohydrin to produce hydracrylic acid. The net result of my process is that a quantity of sodium hydracrylate is recycled.

The following data shows the results obtained in accordance with my process:

Unwashed cake:
    Estimated weight_____kg__ 15
    Per cent hydracrylic acid in cake_____ 11.3
Washed cake:
    Weight_____kg__ 13.2
    Weight 25% NaOH soln. used_____kg__ 9.8
    Per cent NaOH in cake_____ 2.0
    Per cent Na₂SO₄ in cake_____ 89.8
    Per cent sodium hydracrylate as hydracrylic acid in cake_____ 0.2
The centrifugate:
    Weight_____kg__ 11.9
    Per cent NaOH_____ 12.8
    Per cent Na₂SO₄_____ ¹3.3
    Per cent recovery of hydracrylic acid__ 94.0

¹ At 25° C. pure water dissolves 21.9% by weight of Na₂SO₄.

This process is applicable to the extraction of hydracrylic acid from salts other than sodium sulfate. Thus, for example, any salt of hydracrylic acid may be converted into the free acid by reaction with any acid stronger than hydracrylic acid, e. g., sulfuric acid, etc. This will result in a mixture of hydracrylic acid and a salt of the other acid.

Among the salts which may be converted to hydracrylic acid, the following are examples: sodium hydracrylate, potassium hydracrylate, etc. These salts of hydracrylic acid may be prepared in some instances by the hydrolysis of ethylene cyanohydrin but they can also be prepared by any other desired or suitable method. Similar solutions of salts or the salts themselves mixed with hydracrylic acid obtained by any other methods than those described herein may be purified in the manner described. Actually my process finds its chief commercial application in those cases where the solution of a salt of hydracrylic acid may be employed in another hydrolysis of ethylene cyanohydrin.

The concentration of the extracting solution may be varied widely but I prefer to employ a solution which is relatively concentrated, i. e., about 25%. Solutions from about 5% up to about the saturation point may be used if desired. Solutions of potassium hydroxide and the like may be employed in place of part or all of the sodium hydroxide used in the foregoing example.

In some instances I have employed the term "extracting" in referring to the process of washing a salt having hydracrylic acid adhering thereto with an aqueous solution of an alkaline hydroxide. As this term is used herein, it obviously refers to the removal of the hydracrylic acid from the salt in the form of a salt of hydracrylic acid.

The process of converting ethylene cyanohydrin into a salt of hydracrylic acid, as set forth above, is disclosed and claimed in a copending application of Bryan C. Redmon and George R. Griffin, Serial No. 461,231, filed October 7, 1942, and the process of producing free hydracrylic acid is described and claimed in an application of the same inventors, Serial No. 462,050, filed October 14, 1942.

Obviously, many modifications and variations in the compositions and processes described above may be made without departing from the spirit and scope of the invention as defined in the appended claims.

I claim:

1. A process which comprises hydrolyzing ethylene cyanohydrin in an aqueous solution of an alkali metal hydroxide, adding sufficient sulfuric acid to the resulting solution to convert the alkali metal hydracrylate thus formed into free hydracrylic acid and an alkali metal salt of the sulfuric acid, evaporating water to leave hydracrylic acid and precipitated alkali metal salt of the sulfuric acid, substantially separating the alkali metal salt from the hydracrylic acid, washing the salt with an aqueous solution of the same alkali metal hydroxide mentioned above thereby removing the hydracrylic acid adhering to the salt and utilizing the resulting solution in the hydrolysis of ethylene cyanohydrin in another cycle of the process.

2. A process which comprises hydrolyzing ethylene cyanohydrin in an aqueous solution of sodium hydroxide, converting the resulting sodium hydracrylate into free hydracrylic acid by treatment with sulfuric acid thereby forming sodium sulfate, removing water, substantially separating the hydracrylic acid from the sodium sulfate, washing the sodium sulfate with an aqueous solution of sodium hydroxide thereby removing the hydracrylic acid adhering to the sulfate and utilizing the resulting solution of sodium hydracrylate and sodium hydroxide in the hydrolysis of ethylene cyanohydrin in another cycle of the process.

3. A process which comprises hydrolyzing ethylene cyanohydrin in an aqueous solution of sodium hydroxide, converting the resulting sodium hydracrylate into free hydracrylic acid by treatment with sulfuric acid thereby forming sodium sulfate, removing water, centrifuging the hydracrylic acid from the sodium sulfate, washing the sodium sulfate with an aqueous solution of sodium hydroxide thereby removing the hydracrylic acid adhering to the sulfate and utilizing the resulting solution of sodium hydracrylate and sodium hydroxide in the hydrolysis of ethylene cyanohydrin in another cycle of the process.

4. A process which comprises hydrolyzing ethylene cyanohydrin in an aqueous solution of sodium hydroxide, converting the resulting sodium hydracrylate into free hydracrylic acid by treatment with sulfuric acid thereby forming sodium sulfate, removing water, filtering the hydracrylic acid from the sodium sulfate, washing the sodium sulfate with an aqueous solution of sodium hydroxide thereby removing the hydracrylic acid adhering to the sulfate and utilizing the resulting solution of sodium hydracrylate and sodium hydroxide in the hydrolysis of ethylene cyanohydrin in another cycle of the process.

5. A process as in claim 1 wherein the alkali metal hydroxide is potassium hydroxide.

HAROLD S. DAVIS.